United States Patent
Sobotta et al.

[11] Patent Number: 5,917,544
[45] Date of Patent: Jun. 29, 1999

[54] SENSOR ELEMENT ARRAY AND METHOD FOR SIGNAL OR IMAGE PROCESSING

[75] Inventors: Gerald Sobotta, Sauerlach; Willi Platz, Munich; Helmut Riedel, Fuerstenfeldbruck; Karl Hofmann, Ulm, all of Germany

[73] Assignees: Daimler-Benz Aktiengesellschaft, Stuttgart; Temic Telefunken Microelectronic GmbH, Heilbronn, both of Germany

[21] Appl. No.: 08/686,388

[22] Filed: Jul. 25, 1996

[30] Foreign Application Priority Data

Jul. 25, 1995 [DE] Germany ................. 195 27 079

[51] Int. Cl.$^6$ .................................... H04N 5/228
[52] U.S. Cl. ................. 348/222; 348/294; 348/332; 250/208.1
[58] Field of Search ................. 348/207, 222, 348/294, 302, 307, 308, 332; 250/208.1, 208.2, 208.4, 208.6

[56] References Cited

U.S. PATENT DOCUMENTS

| | | | |
|---|---|---|---|
| 4,786,818 | 11/1988 | Mead | 348/308 |
| 5,062,000 | 10/1991 | Harris | 348/241 |
| 5,517,019 | 5/1996 | Lopez | 250/208.1 |

OTHER PUBLICATIONS

Christof Koch et al., "Analog 'neuronal' networks in early vision", Proc. Natl. Acad. Sci., USA, vol. 83, Jun. 1986, pp. 4263–4267.

A. Lumsdaine et al., "Nonlinear Analog Networks for Image Smoothing and Segmentation", Journal of VLSI Signal Processing, 3, 1991, pp. 53–68.

Helmuth Lemme et al., "Pixel wie Bienenwaben", Elektronik 23/1992, pp. 98, 100–102.

Jaroslav Hynecek, "BCMD–An Improved Photosite Structure for High–Density Image Sensors", Transactions on Electron Devices, vol. 38, No. 5, May 1991.

*Primary Examiner*—Bryan Tung
*Attorney, Agent, or Firm*—Evenson, McKeown, Edwards & Lenahan, P.L.L.C.

[57] ABSTRACT

An arrangement and method for processing a signal field of sensor signals which originate from the individual sensor elements, for example photodetectors, of a plurality of sensor elements which are regularly spaced in an area and which are each surrounded by six adjacent sensor elements while forming a hexagonal structure. A differential amplifier compares a quantity representing the potential difference and a reference quantity forms a switching quantity ($I_{Mo}$) on the output side. A switching comparator, on the input side, receives the switching quantity and, if this switching quantity exceeds the preselectable switching threshold, on the output side emits a switching pulse which causes the "off" switching condition. Four signal outputs 1, 2, 3, 4 as well as four signal inputs ($I_{M1}, I_{M2}, I_{M3}, I_{M4}$) are each connected with a signal input and a signal output of one of the four analog circuits assigned to the four next adjacent switchable resistors, one signal respectively being supplied to the four signal outputs which represents the switching quantity. A switching stage for forming the reference quantity takes into account the signals present at the four signal inputs.

18 Claims, 5 Drawing Sheets

SENSOR ELEMENT ARRAY AND METHOD FOR SIGNAL OR IMAGE PROCESSING

BACKGROUND AND SUMMARY OF THE INVENTION

This invention relates to an arrangement for processing signals and particularly images as well as to a signal processing method and particularly an image processing method.

An image processing arrangement and a pertaining method are known from U.S. Pat. No. 5,062,000.

Previously known and applied image processing methods for noise reduction in images and for edge detection are usually purely digital methods which process image data of conventional CCD images with an efficient processor connected behind them. Solutions by means of analog circuits and methods are currently only investigated in a few locations, such as the California Institute of Technology (Caltech) or the Massachusetts Institute of Technology (MIT) in the U.S. First industrial applications are known only in the U.S. at Rockwell or at Tanner Research.

The analog circuits obtained there are based on networks of switchable resistors (fuses) which may also have non-linear characteristics and which, together with image-recording photodiodes or phototransistors are monolithically integrated in CMOS technology. The networks are designed such that each image point (pixel) of such an imager is connected with all its neighbors by way of switchable resistance elements. When the resistors are in the current-carrying "on" condition, they compensate the signal differences of adjacent image points and therefore contribute to noise reduction. In the interrupted "off" condition, the signal difference of adjacent image points appears strongly enhanced. As a result, edges within an image are enhanced and the limits of image segments can therefore be determined.

However, a circuit constructed in this manner treats accidental brightness differences in the same fashion as systematic brightness differences. This deficiency of the circuit characteristics does not permit a consequent noise reduction within individual image segments because the image segments themselves have noisy boundaries.

Preliminary studies (Chr. Koch, J. Marroquin and A. Yuille, *Proc. Natl. Acad. Sci.,* USA, Vol. 83, pp. 4263–4267, June 1986 Biophysics) have shown that the task of the simultaneous noise reduction and segmentation can be solved in principle by means of two feedback circuits. This was proven for orthogonally organized pixel grids. However, these 10 year old studies could not be converted into an analog circuit because the applied algorithms would have required a circuit too high complexity. An imager with a pixel number that would match with application requirements could hardly have been implemented. Therefore, further studies were limited to simplified and correspondingly less efficient architectures, for example, to simple networks (A. Lumsdaine, J. L. Wyatt Jr., I. M. Elfadel, *Journal of VLSI Signal Processing,* 3, 53–68 (1991)).

This demonstrates that the problem of noise reduction in images and of an extraction of object edges by means of analog, image-processing circuits has currently not been solved in a satisfactory manner.

Underlying Object

It is therefore an object of this invention to develop a method by means of which a reliable segmentation of images as well as a simultaneous noise reduction within individual image segments becomes possible. In this case, noise reduction and segmentation should support one another recursively. Furthermore, gaps in the segment edges are to be repaired, in which case the degree of repair must be adjustable. The implementation of the method is to be demonstrated by means of an analog circuit. Being realized an integrated circuit such a device should also be suitable for the implementation of intelligent imagers with a larger number of image points (for example, 256×256).

DETAILED DESCRIPTION OF THE INVENTION

Figure 1:
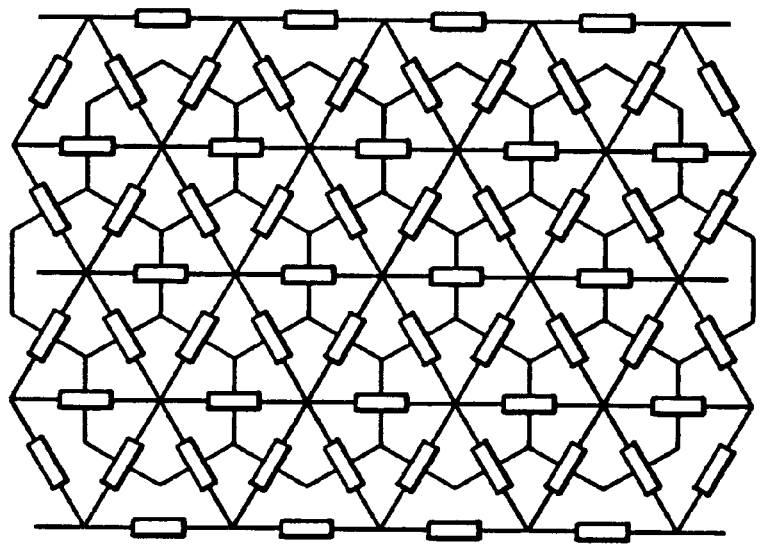
FIG. 1 shows a pixel lattice with switchable resistors.
Figure 2:
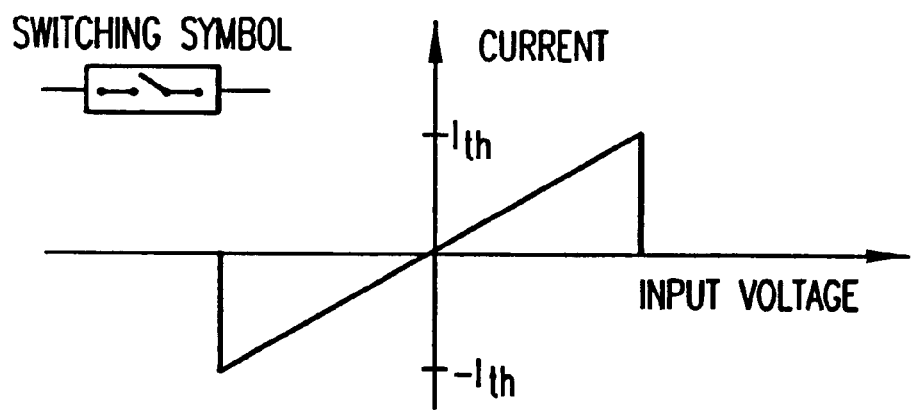
FIG. 2 shows a characteristic current voltage curve of the switchable resistors.
Figure 3:
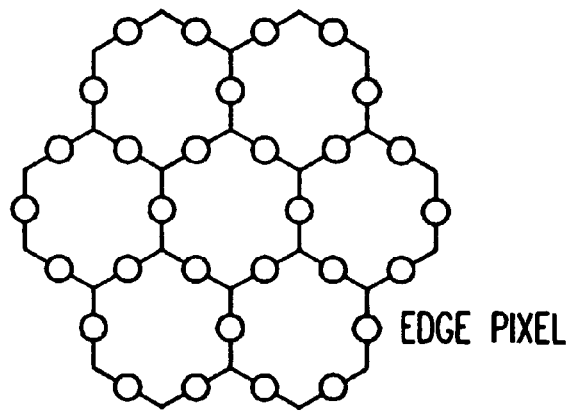
FIG. 3 shows the structure of the superimposed edge lattice.

The new method by means of which the functions of noise reduction and of edge extraction can be realized in real time utilizes the architecture of a new electric circuit. One type of component of the circuit for the function of image acquisition are photosensitive pixels consisting of photodiodes or phototransistors. Between adjacent pixels, local links are established for the function of image processing by connecting electronic components, such as amplifiers, comparators, analog multipliers and squaring components in an appropriate manner.

Such a network has the efficiency required for image processing and can be implemented as a monolithic integrated circuit. The network structure is represented by a honeycomb lattice with hexagonal pixels. Each pixel is directly surrounded by switchable resistors which are arranged along the six edges of the honeycomb (Illustration 1). In this arrangement, the switchable resistors themselves form a triangular lattice.

The photo-sensitive elements can be integrated at the nodes of the network within the structure. In a further embodiment, all photo-sensitive elements can also be situated on a separate imager. The signals of the individual pixels must then be fed into the nodes of the network. This can take place, for example, by way of multiplexer circuits or by way of three-dimensional arrangements with interconnections in each pixel.

In addition to the processing of image data, the network can also be used for the processing of arbitrary two-dimensional signal fields. For example, instead of the photo-sensitive elements, other sensor elements, such as gas sensors or pressure sensors may also be present as signal generators. As an alternative, the signal fields may represent the result of data processing methods.

In all cases, the signals are guided to feeding points which in the hexagonal network are called "pixels".

The operating condition of the switchable resistors ("on" or "off") is a function of the local voltage drop over the respective resistor, that is, of the signal difference of adjacent pixels. In the "on" operating condition, the current supplies by means of the resistance element the information concerning the brightness difference of the adjacent pixels. If the current exceeds a predetermined switching threshold, this is an indication of an object edge within the underlying image. The operating condition of the resistance element in this case will change to "off". The switching threshold of the resistors, at which they change from a condition of ohmic conductivity ("on") to the "off" condition, can be set by a control current or a control voltage. Similarly, the slope of the resistor characteristics and thus the resistance value can be adjusted by choosing appropriate parameters for the electronic device as well as by way of control signals. The characteristic current-voltage curve of these resistor elements is shown in Illustration 2.

An appropriate implementation of such elements in CMOS technology is indicated, for example, in J. G. Harris, "Analog Models for Early Vision", PhD-Thesis, California Institute of Technology, Pasadena, 1991.

By means of the arrangement of the switchable resistors within the hexagonal pixel lattice, a superimposed lattice structure according to Illustration 3 is obtained which in the following will be called an edge lattice. The lattice points of this edge lattice contain the information on the operating condition of the switchable resistors and, in addition, also contain the electronic components for the further processing of this information.

According to the invention, an appropriate interconnection of this edge lattice is utilized for the implementation of image-processing functions. By means of the method described in the following, edges, which exist throughout the image, can be favored. Likewise, slightly disturbed edges can be corrected. In contrast, short isolated edge pieces are eliminated.

Figure 4:
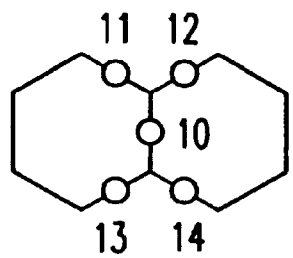
FIG. 4 shows local switching conditions in the neighborhood of an edge pixel for local line variables.

In the above-mentioned preliminary studies, the switching condition of the switchable resistors is indicated by a local line variable $1$. This line variable can take the values $1=0$ or $1=1$. In order to, by means of these variables, meet the requirements with respect to noise reduction segmentation in a network with a local interconnection of the elements, the method must promote the relationships outlined in Illustration 4. If the edge lattice in Illustration 3 is used as a basis, four neighbors exist for each edge pixel which are situated at the boundaries of the hexagonal structure. For the switching condition $1_0$ of each edge pixel (as shown in FIG. 4), the following must therefore apply:

| Neighborhood Nachbarschaft | | | | Preferred Correlation bevorzugie Korrelation |
|---|---|---|---|---|
| $1_1$ | $1_2$ | $1_3$ | $1_4$ | $1_0$ |
| 0 | 0 | 0 | 0 | 0 |
| 1 | 1 | 0 | 0 | 0 |
| 0 | 0 | 1 | 1 | 0 |
| 1 | 1 | 1 | 1 | 0 |
| 1 | 0 | 1 | 0 | 1 |
| 1 | 0 | 0 | 1 | 1 |
| 0 | 1 | 1 | 0 | 1 |
| 1 | 0 | 0 | 1 | 1 |

Figure 5:
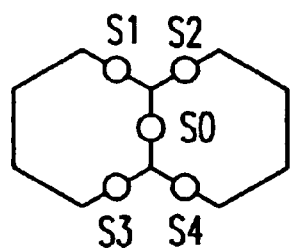
FIG. 5 shows local switching conditions in the neighborhood of an edge pixel for condition variables.
Figure 6:
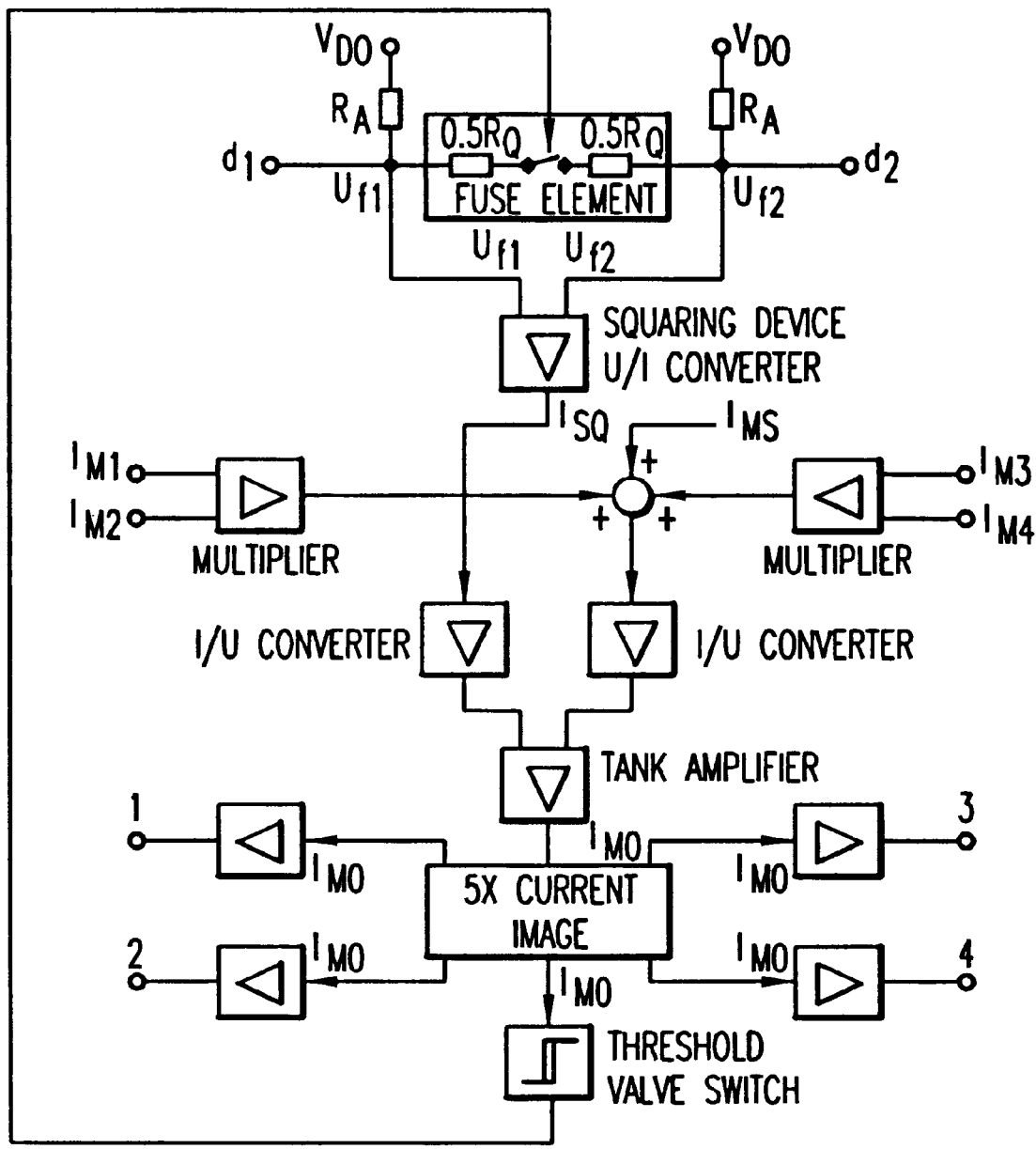
FIG. 6 shows an analog circuit for implementing the image-processing method.

A special representation of the switching conditions which occur on the switchable resistors clarifies the correlations. If the variable $S_i$ is used as the state variable with $$S_i = 2\, l_i - 1 \quad (1)$$

a simple method is indicated in order to implement, on the basis of the neighborhood-related local switching conditions of the switchable resistors, a dynamic adaptation of the switching threshold. The condition variable $S_0$ of an edge pixel surrounded by four neighbors (as shown in FIG. 5) assumes the following values:

| Neighborhood Nachbarschaft | | Preferred Correlation bevorzugie Korrelation |
|---|---|---|
| $S_1 S_2 = 1$ | $S_3 S_4 = 1$ | $S_0 = -1$ |
| $S_1 S_2 = -1$ | $S_3 S_4 = -1$ | $S_0 = +1$ |

When, for the local voltage drop $\Delta f$ on a switchable resistor, a static switching threshold $H_S$ is introduced by $$\mu(\Delta f_0)^2 - H_S = 0 \text{ with } \mu, H_S > 0 \quad (2)$$

a generalization to the dynamic case is achieved by $$\mu(\Delta f_0)^2 - H_S - K S_1 S_2 - K S_3 S_4 = 0 \text{ with } \mu, H_{S,K} > 0 \quad (3)$$

If, by means of the values of the state variables $S_1$, $S_2$, $S_3$ and $S_4$, a switching condition $S_0 = -1$ is favorized, the switching threshold of the switchable resistor is increased. If $S_0 = +1$ is favorized, the switching threshold is lowered.

This comparatively simple form of a dynamic switching threshold can be formulated in the same manner for continuous values of a variable $M_i (-1 \leq M_i \leq +1)$.

$$H_S^{dyn} = H_S + K M_1 M_2 + K M_3 M_4 \quad (4)$$

By means of this equation, the information is obtained of whether the estimated value $M_i$ taken for a switching condition is certain ($M_i \sim \pm 1$) or whether the estimated value implies uncertainties ($/M_i/ \ll 1$).

The effectiveness of such a dynamic threshold is comparable to the considerably more complex dynamic threshold in the studies of Caltech (Koch, et al.) but the discussed network is considerably simpler.

Illustration 6 shows the block diagram of an analog electronic circuit by means of which the function of a dynamic switching threshold adjustment is implemented. The block diagram contains the elementary cell of an image-processing, hexagonally organized pixel structure according to Illustration 1. The individual electronic functions within the elementary cell are implemented mainly by means of analog circuit components.

Specifically, the cell contains the following components: a switchable resistor (fuse element), a squaring amplifier, a summation stage, a differential amplifier with a tanh-characteristic, current mirrors for signal coupling as well as a comparator stage the output of which is fed back to the fuse element. For the implementation, a CMOS-technology is used, but the circuit can also be implemented in other technologies, for example, as a bipolar, NMOS, PMOS or BICMOS circuit. In case of CMOS, analog circuit is operated in current mode.

Fuse Element

The two data inputs $d_1$ and $d_2$ of the fuse element are connected with two adjacent pixels of an Imager. From each of these two pixels, a portion of the photocurrents is supplied to the fuse element. The coupling between the two inputs, that is, the resistance of the fuse element, is varied by way of a bias current.

Squaring Amplifier

A squaring amplifier connected in series with the fuse element forms the square of the differential voltage which drops at the fuse element, and converts the output signal into a current quantity $I_{SQ}$. In the square characteristic curve of the output signal, the parabolic opening can be varied by means of a bias current or a bias voltage. The position of the vertex of the parabola can also be designed to be variable by choosing appropriate parameters for the individual transistors within the amplifier component.

The functionality of the squaring device, as an alternative, can also be implemented by forming the absolute value (module) or by another convex symmetrical function.

Multiplier and Adding Stage

By means of two four-quadrant multipliers, according to the diagram in Illustration 5, the product of the signals $S_1S_2$ and $S_3S_4$ of two adjacent edge pixels respectively is formed. By feeding bias currents, the amplification factor of the multiplier components can be adjusted. The two signal products of the four adjacent edge pixels, together with an offset current $I_{HS}$ ("static threshold") form a sum signal ("dynamic threshold", equation (4)) which is required as the current signal for the further conversion of the image processing method.

Tangent Hyperbolicus Amplifier

In an amplifier stage which follows, the signal difference is formed of this sum signal and of the signal of the squaring amplifier. In order to obtain, in the case of larger differences of the input signal, a soft limitation of the output signal in this amplifier stage, the amplifier stage must have a tanh-characteristic. This is achieved by the use of a U/Iamplifier. For this purpose, a previous conversion of the input current into voltages is required. The output signal is again, provided as a current quantity $I_{M0}$.

Current Mirror for Signal Coupling

Portions of the current $I_{M0}$ are returned by means of appropriate current images to the four adjacent edge pixels $S_1, S_2, S_3$ and $S_4$ according to the arrangement in Illustration 5.

Comparator

In a comparator, the current value $I_{M0}$ is compared with an adjustable threshold. From this comparison, a digital signal is derived which is fed back to the fuse element and which interrupts it, when the switching threshold is exceeded ("off" condition).

Alternative Circuit for Implementing the Process

In an integrated circuit, which implements the described process, the large chip area required for the analog multiplier components is a disadvantage. Conceptional and circuit-design alternatives therefore have to developed be which permit a simplification of the multiplication function without impairing the functionality of the overall circuit. In particular, the symmetry characteristics of the multiplication function must be maintained.

As a rule, a multiplication function supplies the result as a smooth curve. As a simplification, the result may also be represented in a quantized manner by means of a "step curve". If the number of steps is varied, the approximation to a smooth curve and therefore the precision of the process can be controlled. In the following, an embodiment will be indicated for this purpose which is based on the circuit architecture of Illustration 6 and uses a three-step quantization.

Figure 7:
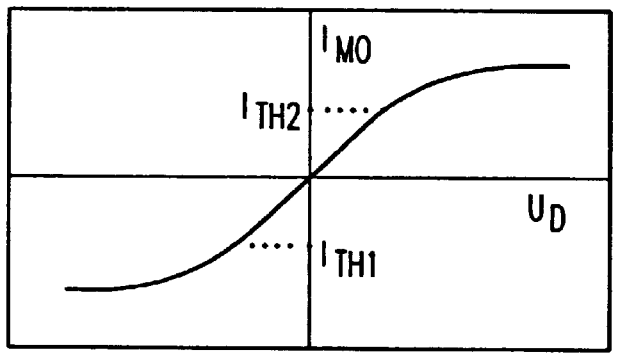
FIG. 7 shows quantizing thresholds of the tanh amplifier.

For the purpose of quantization of the output current $1_{M0}$ of the tanh-amplifier (Illustration 6), two symmetrical quantizing thresholds $I_{TH1}$ and $I_{TH2}$ are defined according to FIG. 7. The value of $I_{TH1}$ and $I_{TH2}$ is variable.

By means of comparators, which can easily be implemented, three conditions Z=−1, Z=0 and Z=+1 can be assigned to a state variable Z. In this case, Z=−1 corresponds to an output current $I_{M0}$ which is lower than the threshold $I_{TH1}$. Z=+1 corresponds to a current $I_{M0}$ which is higher than the threshold $I_{TH3}$; and Z=0 corresponds to an output current which ranges between $I_{TH1}$ and $I_{TH2}$.

These three states can be provided by way of three separate data lines with a logical "0" or "1" at the output of a comparator but may also be present in a coded fashion (for example, amplitude-coded) on a single data line.

A simplification of the multiplication function for two input quantities can be achieved, for example, by a control current source with two digital inputs. Illustration 8 shows a basic circuit diagram corresponding to Illustration 6. The information of the four adjacent edge pixels is provided by way of the (digital) data inputs DN1, DN2, DN3 and DN4. As mentioned above, these data inputs can be present either as 3-bit wide buses or as individual lines. By means of a logic circuit, the data inputs DN1 and DN2 or DN3 and DN4 are processed within the controlled source in such a manner that a decision takes place concerning the input current $I_M$ according to the truth table Tab. 5.1. The amount of $I_M$ can be varied as a parameter of the controlled source.

| DN1 DN2 | −1 | 0 | +1 |
|---|---|---|---|
| −1 | $+I_M$ | 0 | $-I_M$ |
| 0 | 0 | 0 | 0 |
| +1 | $-I_M$ | 0 | $+I_M$ |

This shows that an approximated multiplication function for four quandrants can be achieved in a simple manner. The precision of the process can be increased by raising the number of quantizing steps. Likewise, the amount of the source current $I_M$ can also be correlated with the quantizing thresholds for increasing the accuracy.

Network of Elementary Cells

Figure 9:
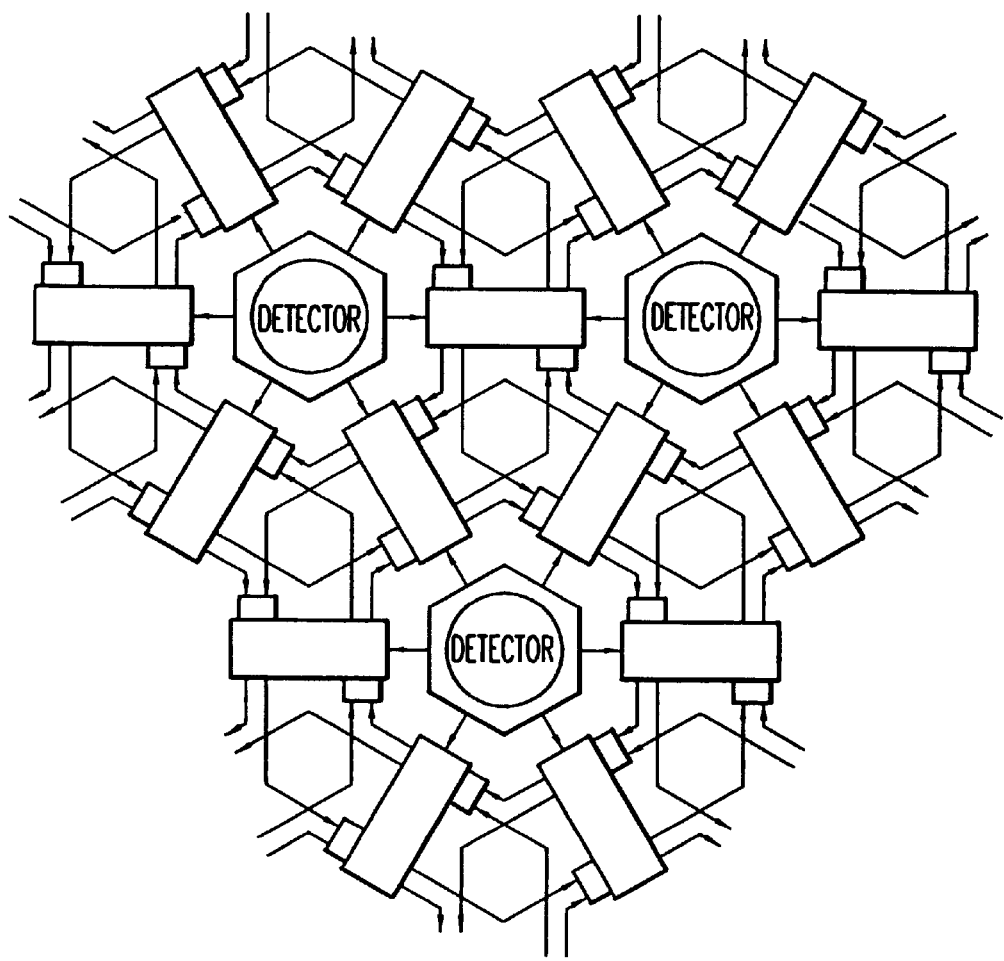
FIG. 9 shows the structure of the image processing analog circuit.
Figure 8:
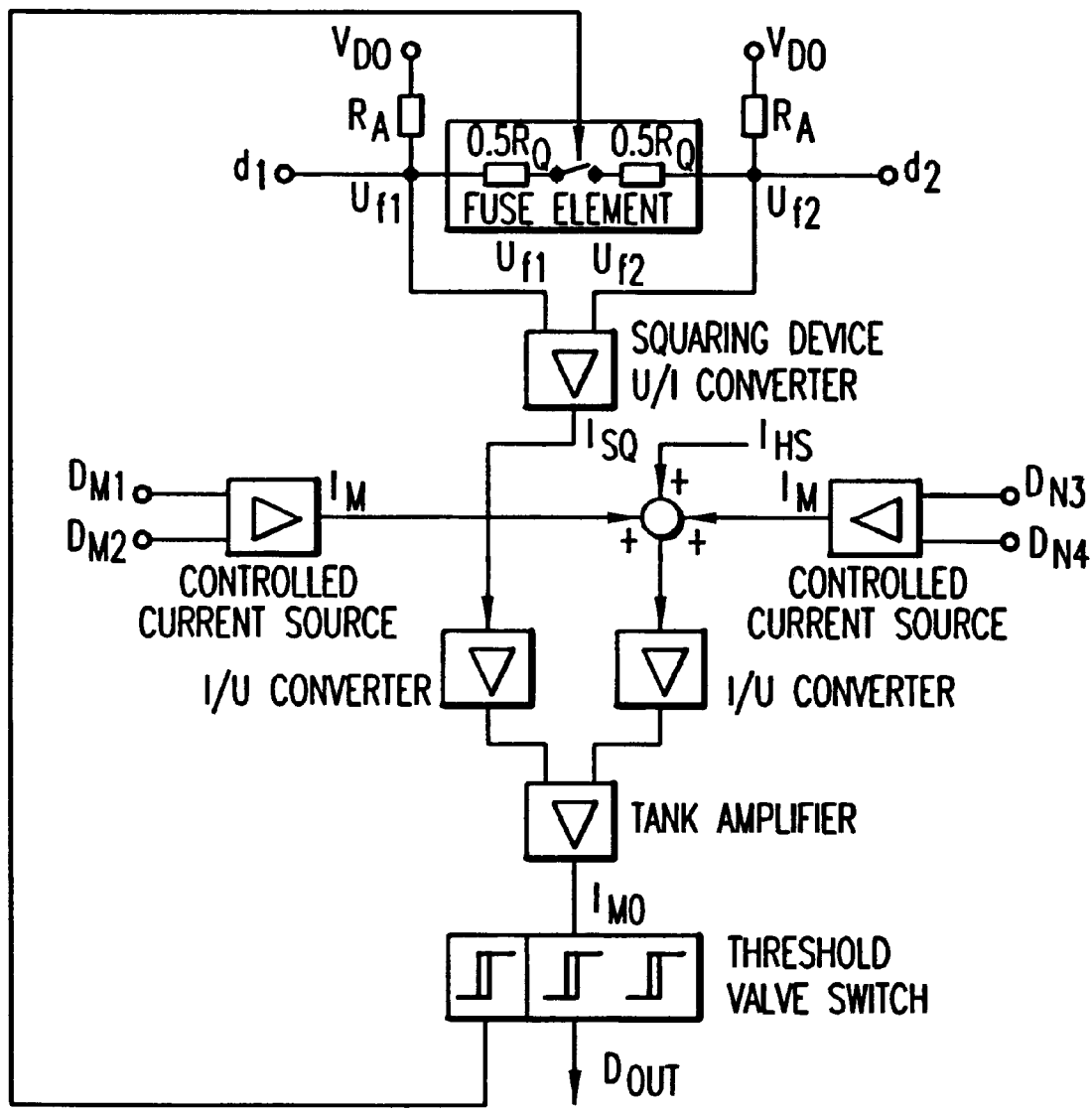
FIG. 8 shows an analog circuit with a simplified multiplicaton function.

An image-processing analog circuit is implemented by means of the described elementary cell in that a network of such cells is wired corresponding to FIG. 9. Corresponding to the architecture with hexagonal pixels and pertaining switchable resistors of Illustration 1, a hexagonal arrangement is also chosen for the implementation of the noise reduction and "edge extraction" functions. Within the architecture, the individual elementary cells form a triangular lattice. The imager can also be integrated in the circuit in the form of light-sensitive detectors, such as photodiodes or phototransistors.

The total number of the required elementary cells and photoelements depends on the requirements of the image processing task. The pixel size, the pixel spacing, the arrangement of the pixels in the two axis directions and the power consumption of the circuit can be individually adjusted by choosing appropriate circuit parameters.

The circuit can also be used such that only certain areas within an image plane (areas of interest) can be processed by it. By means of the suitable choice of the read-out technique of the used imager, the area of interest can be arbitrarily statically and dynamically displaced along the whole image plane so that the image-processing functions of the circuit can also be utilized for tracking applications and for the implementation of an attention control.

We claim:

1. Arrangement for processing a signal field of sensor signals which originate from the individual sensor elements of a plurality of sensor elements which are regularly spaced in an area and which are each surrounded by six adjacent sensor elements while forming a hexagonal structure, the arrangement receiving the sensor signals having feeding points in an assignment which corresponds to the hexagonal structure of the arrangement of the sensor elements, each feeding point being connected with each of the six adjacent feeding points by way of one switchable resistor respectively which can take two switching conditions in which the current conduction through the respective resistor is either interrupted (switching condition "off") or not interrupted (switching condition "on"), and an analog circuit being assigned to each resistor, to which analog circuit a potential difference is fed above the resistor, and which, while taking into account this potential difference as well as a preselectable switching threshold, causes the change between the switching conditions of the respective switchable resistor, characterized by a differential amplifier which, by means of the comparison between a quantity representing the potential difference and a reference quantity forms a switching quantity ($I_{M0}$) on the output side, a switching comparator which, on the input side, receives the switching quantity and, if this switching quantity exceeds the preselectable switching threshold, on the output side emits a switching pulse which causes the "off" switching condition, four signal outputs 1, 2, 3, 4 as well as four signal inputs ($I_{M1}$, $I_{M2}$, $I_{M3}$, $I_{M4}$) which are each connected with a signal input and a signal output of one of the four analog circuits assigned to the four next adjacent switchable resistors, one signal respectively being supplied to the four signal outputs which represents the switching quantity, and a switching stage for forming the reference quantity while taking into account the signals present at the four signal inputs.

2. Arrangement according to claim 1, characterized in that the signal inputs in pairs are connected with one multiplier respectively whose outputs are supplied to two inputs of a summation point emitting the reference quantity on the output side.

3. Arrangement according to claim 2, characterized in that a signal representing a static switching threshold is supplied to another input of the summation element.

4. Arrangement according to claim 3, characterized in that the differential amplifier is an amplifier with a tanh-characteristic.

5. Arrangement according to claim 2, characterized in that the differential amplifier is an amplifier with a tanh-characteristic.

6. Arrangement according to claim 1, characterized in that the differential amplifier is an amplifier with a tanh-characteristic.

7. Arrangement for processing images, having a plurality of photodetector elements which are regularly spaced in an area and which are each surrounded by six adjacent photodetector elements while forming a hexagonal structure and are connected to the adjacent photodetector elements by way of switchable resistors which can take two switching conditions in which the current conductance through the respective resistor is either interrupted (switching condition "off") or not interrupted (switching condition "on"), an analog circuit being assigned to each resistor, to which analog circuit the potential difference is supplied which is above the respective switchable resistor, and which, while taking into account this potential difference as well as a preselectable switching threshold, causes the change between the switching conditions of the respective switchable resistor, characterized by a differential amplifier which, by means of the comparison between a quantity representing the potential difference and a reference quantity, forms a switching quantity ($I_{M0}$) on the output side, a switching comparator which, on the input side, receives the switching quantity and, if this switching quantity exceeds the preseletable switching threshold, on the output side, emits a switching pulse which causes the "off" switching condition, four signal outputs 1, 2, 3, 4 as well as four signal inputs ($I_{M1}$, $I_{M2}$, $I_{M3}$, $I_{M4}$) which are each connected with a signal input and a signal output of one of the four analog circuits assigned to the four next adjacent resistors, one signal respectively being supplied to the four signal outputs which represents the switching quantity, and a switching stage for forming the reference quantity while taking into account the signals present at the four signal inputs.

8. Arrangement according to claim 7, characterized in that the signal inputs in pairs are connected with one multiplier respectively whose outputs are supplied to two inputs of a summation point emitting the reference quantity on the output side.

9. Arrangement according to claim 8, characterized in that a signal representing a static switching threshold is supplied to another input of the summation element.

10. Arrangement according to claim 9, characterized in that the differential amplifier is an amplifier with a tanh-characteristic.

11. Arrangement according to claim 8, characterized in that the differential amplifier is an amplifier with a tanh-characteristic.

12. Arrangement according to claim 7, characterized in that the differential amplifier is an amplifier with a tanh-characteristic.

13. Signal processing method for use in an arrangement for processing a signal field of sensor signals which originate from the individual sensor elements of a plurality of sensor elements which are regularly spaced in an area and which are each surrounded by six adjacent sensor elements while forming a hexagonal structure, the arrangement for receiving the sensor signals having feeding points in an assignment which corresponds to the hexagonal structure of the arrangement of the sensor elements, each feeding point being connected with each of the six adjacent feeding points by way of one switchable resistor respectively which can take two switching conditions of a different electric conductivity, and the change between the switching conditions at the respective switchable resistor being caused while taking into account the potential difference above the resistor as well as a preselectable switching threshold, characterized in that, for each switchable resistor, an analysis process is carried out in which a switching quantity is derived from a comparison between a quantity representing the potential difference and a reference quantity and, from a comparison of this switching quantity and a preselectable switching threshold a criterion is obtained for the change between the two switching conditions of the respective switchable resistor, for forming the reference quantity, information concerning four switching quantities being used which are simultaneously formed in the analysis processes carried out for the respective four next adjacent switchable resistors.

14. Method according to claim 13, characterized in that two switching quantities respectively of the four switching quantities from the analysis processes each assigned to the four next adjacent switching resistors are combined in pairs by multiplication and the two resulting products are added for forming the reference quantity.

15. Process according to claim 14, characterized in that, during the formation of the reference quantity, a preselectable static switching threshold is added.

16. Image processing method for use in an arrangement, having a plurality of photodetector elements which are regularly spaced in an area and which are each surrounded by six adjacent photodetector elements while forming a hexagonal structure and are connected to the adjacent phtodetector elements by way of switchable resistors which can assume two switching conditions of a different electric conductivity, the change between the switching conditions at the respective switchable resistor being caused while taking into account the potential difference above the resistor as well as a preselectable switching threshold, characterized in that, for each switchable resistor, an analysis process is carried out in which a switching quantity is derived from a comparison between a quantity representing the potential difference and a reference quantity and, from a comparison of this switching quantity and a preselectable switching threshold a criterion is obtained for the change between the two switching conditions of the respective switchable resistor, for forming the reference quantity, information concerning four switching quantities being used which are simultaneously formed in the analysis processes carried out for the respective four next adjacent switchable resistors.

17. Method according to claim 16, characterized in that two switching quantities respectively of the four switching quantities from the analysis processes each assigned to the four next adjacent switching resistors are combined in pairs by multiplication and the two resulting products are added for forming the reference quantity.

18. Process according to claim 17, characterized in that, during the formation of the reference quantity, a preselectable static switching threshold is added.

* * * * *